United States Patent [19]

Miyamoto

[11] Patent Number: 5,082,252

[45] Date of Patent: Jan. 21, 1992

[54] FLUID-FILLED MOUNT

[75] Inventor: Yasuo Miyamoto, Tochigi, Japan

[73] Assignee: Honda Giken Kogyo Kabushiki Kaisha, Tokyo, Japan

[21] Appl. No.: 639,408

[22] Filed: Jan. 10, 1991

Related U.S. Application Data

[63] Continuation of Ser. No. 471,043, Jan. 26, 1990, which is a continuation of Ser. No. 275,471, Nov. 23, 1988, abandoned.

[30] Foreign Application Priority Data

Nov. 25, 1987 [JP] Japan .................. 62-179139

[51] Int. Cl.$^5$ .............................................. F16F 13/00
[52] U.S. Cl. ........................... 267/140.1 A; 180/312; 248/562; 248/634; 248/636; 267/219; 267/292
[58] Field of Search ............ 267/140.1 R, 140.1 A, 267/140.1 C, 219, 220, 35, 292, 141; 248/60, 61, 562, 634, 635, 636; 180/300, 312, 902

[56] References Cited

U.S. PATENT DOCUMENTS

| 1,683,330 | 9/1928 | Chilton | 267/141 X |
|---|---|---|---|
| 4,262,886 | 4/1981 | LeSalver et al. | 267/141 X |
| 4,401,298 | 8/1983 | Eaton et al. | 267/140.1 |
| 4,415,391 | 11/1983 | Reid | 267/292 X |
| 4,746,104 | 5/1988 | Probst | 248/60 X |
| 4,750,720 | 6/1988 | Wolf et al. | 267/35 X |

FOREIGN PATENT DOCUMENTS

| 58-20 | 1/1983 | Japan . | |
| 164428 | 9/1984 | Japan | 267/140.1 |
| 274130 | 12/1986 | Japan | 267/140.1 |
| 113934 | 5/1987 | Japan | 267/140.1 |
| 912975 | 3/1982 | U.S.S.R. | 267/153 |

Primary Examiner—George E. A. Halvosa
Attorney, Agent, or Firm—Armstrong, Nikaido, Marmelstein, Kubovcik & Murray

[57] ABSTRACT

A fluid-filled mount includes a body made of a resilient material and having a structural member supporting region on one end and a vibrating member supporting region on the opposite end. The body has a main fluid chamber defined therein between the structural member and vibrating member supporting regions, at least one auxiliary fluid chamber defined therein laterally of the main fluid chamber, and an orifice communicating between the main and auxiliary fluid chambers. A fluid is filled in the main fluid chamber, the auxiliary fluid chamber, and the orifice.

5 Claims, 1 Drawing Sheet

FIG. 2 FIG. 3
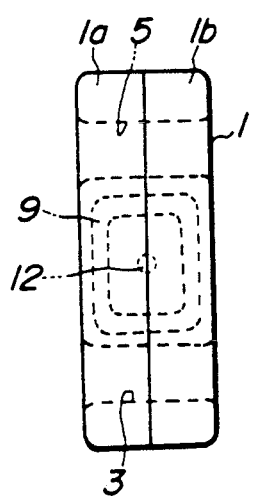 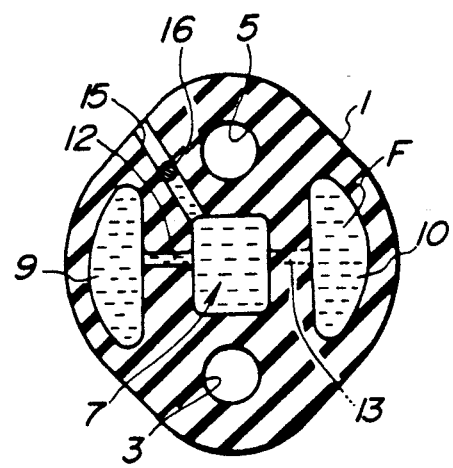
FIG. 4 FIG. 1
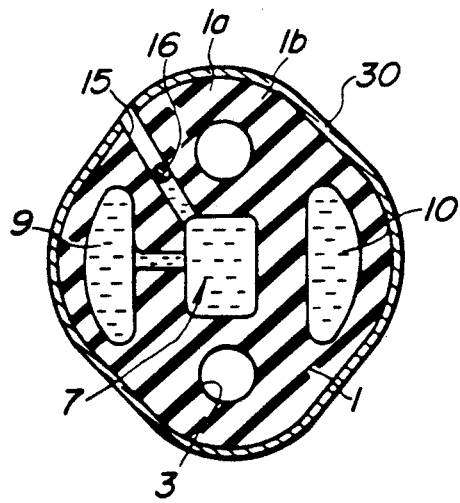 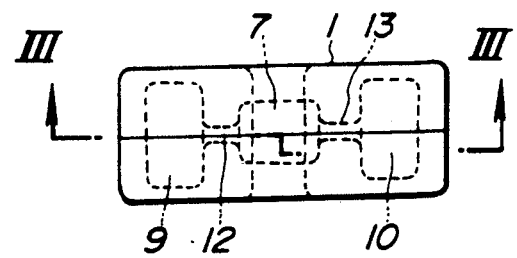

FLUID-FILLED MOUNT

This application is a continuation of application Ser. No. 471,043 filed Jan. 26, 1990, in turn a continuation of application Ser. No. 275,471 filed Nov. 23, 1988, both now abandoned.

BACKGROUND OF THE INVENTION

1. Field of the Invention

The present invention relates to a mount for being interposed between a vibrating member and a structural member, and more particularly to a fluid-filled mount in which a fluid is filled.

2. Description of the Relevant Art

For mounting a vibrating member such as a muffler or the like on a structural member such as an automobile body, it has been customary to interpose a vibroisolating mount between the vibrating member and the structural member for preventing vibrations from being transmitted from the vibrating member to the structural member.

As disclosed in each of FIGS. 1 and 2 of Japanese Laid-Open Utility Model Publication No. 58-20, one known vibroisolating mount is made of rubber and interposed between a vibrating member (muffler) and a structural body (automobile body). Vibrations from the vibrating member are absorbed and dampened primarily by the resiliency of the resilient rubber body of the mount. If the spring constant of the resilient body is reduced to obtain large damping forces, then the resilient body becomes less durable. Conversely, if the spring constant of the resilient body is increased for increased durability, then the available damping forces are reduced. To avoid these problem, a mount shown in each of FIGS. 3, 6 through 8 of the above publication is comprised of a combination of a resilient body comprising a rubber body and a coil spring or coil springs, and an oil damper to obtain desired damping forces and durability.

Since the disclosed mount includes the resilient body and the oil damper which includes metallic components and is complex in structure, the mount is heavy, has a large number of parts, is assembled in a large number of assembling steps, and is highly costly to manufacture.

SUMMARY OF THE INVENTION

It is an object of the present invention to provide a fluid-filled mount which has desired damping characteristics, is simple in structure, lightweight, highly durable, made up of a reduced number of part, and can be manufactured at a low cost.

A fluid-filled mount according to the present invention comprises a body made of a resilient material and having a structural member supporting region on one end and a vibrating member supporting region on the opposite end; the body having a main fluid chamber defined therein between the structural member and vibrating member supporting regions, at least one auxiliary fluid chamber defined therein laterally of the main fluid chamber, and an orifice communicating between the main and auxiliary fluid chambers; and a fluid filled in the main fluid chamber, the auxiliary fluid chamber, and the orifice.

With the above arrangement, when a vibrating member supported by the vibrating member support region is vibrated, the resilient body is expanded and contracted to force the fluid into and out of the main and auxiliary fluid chambers. Vibrations applied from the vibrating member are absorbed by the resiliency of the body. Sufficient damping forces are produced by the flow of the fluid between the main and auxiliary fluid chambers via the orifice in response to the expansion and contraction of the body.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 1 is a front elevational view of a fluid-filled mount according to an embodiment of the present invention;

FIG. 2 is a side elevational view of the fluid-filled mount shown in FIG. 1;

FIG. 3 is a cross-sectional view taken along line III—III of FIG. 1; and

FIG. 4 is a cross-sectional view of a fluid-filled mount according to another embodiment of the present invention.

DETAILED DESCRIPTION OF THE PREFERRED EMBODIMENTS

FIGS. 1 through 3 show a fluid-filled mount according to an embodiment of the present invention. The fluid-filled mount includes a relatively flat body 1 of a substantially lozenge shape made of a resilient material such as rubber. In this embodiment, the resilient body 1 is manufactured by partly vulcanizing two body halves 1a, 1b (FIG. 2), separate along a central plane in the transverse direction of the body 1, in respective molds, then bonding the body halves 1a, 1b to each other with an adhesive, and thereafter vulcanizing the body halves 1a, 1b in a mold under compression to form the body 1.

The body 1 has a support hole 3 defined in one diametrical end thereof for supporting a vibrating member such as an exhaust pipe from an engine (not shown), for example, and another support hole 5 defined in the other diametrical end for supporting a structural member such as an automobile body (not shown). The regions of the body 1 where the support holes 3, 5 are defined serve as vibrating and structural member supporting regions, respectively.

A main fluid chamber 7 is defined centrally in the body 1 between the support holes 3, 5. Two auxiliary fluid chambers 9, 10 are also defined in the body 1 one on each side of the main fluid chamber 7. In the illustrated embodiment, the auxiliary fluid chambers 9, 10 are symmetrically positioned with respect to, or one on each side of, a straight line connecting the support holes 3, 5 across the main fluid chamber 7. The auxiliary fluid chambers 9, 10 are held in communication with the main fluid chamber 7 through respective orifices 12, 13 defined in the body 1.

A fluid F is introduced through an inlet passage 15 defined in the body 1 into the main fluid chamber 7, the orifices 12, 13, and the auxiliary fluid chambers 9, 10. After the main fluid chamber 7, the orifices 12, 13, and the auxiliary fluid chambers 9, 10 have been filled up with the fluid F, the inlet passage 15 is closed by a plug 16 to keep the fluid F filled in the chambers 7, 9, 10 and the orifices 12, 13.

In use, the fluid-filled mount thus constructed is attached to and interposed between a vibrating member such as an engine exhaust pipe (not shown) and a structural member such as an automobile body. When the engine exhaust pipe is vibrated, the body 1 is expanded and contracted vertically in FIG. 3 to force the fluid F to flow into and out of the main fluid chamber 7 and the auxiliary fluid chambers 9, 10. More specifically, when the body 1 is expanded, it is elastically deformed in a direction to displace the support holes 3, 5 away from each other. Therefore, the fluid F flows from the auxiliary fluid chambers 9, 10 through the orifices 12, 13 in to the main fluid chamber 7. Conversely, when the body 1 is contracted, it is elastically deformed to displace the support holes 3, 5 toward each other, so that the fluid F flows from the main fluid chamber 7 via the orifices 12, 13 into the auxiliary fluid chambers 9, 10.

Accordingly, the applied vibrations are absorbed by the resiliency of the body 1. At the same time, sufficient damping forces are produced by the flow of the fluid F into and out of the main fluid chamber 7 in response to expansion and contraction of the body 1.

The vibrating member and the structural member have been described as an engine exhaust pipe and an automobile body, respectively, but may be various components. The structures of the vibrating and structural member supporting regions may be modified dependent on the configurations and sizes of the vibrating member and the structural member.

A fluid-filled mount according to a fourth embodiment of the present invention will be described below with reference to FIG. 4. The fluid-filled mount shown in FIG. 4 is substantially the same as the fluid-filled mount of the preceding embodiment except that the outer peripheral surface of the side of the body 1 is covered with a reinforcing member 30 made of woven fabric, for example, for increasing the mechanical strength of the body 1 especially when it is elongated.

With the present invention, as described above, vibrations transmitted from the vibrating member are absorbed by the resiliency of the body 1, and, at the same time, sufficient damping forces are produced by the flow of the fluid F into and out of the main and auxiliary fluid chambers 7, 9, 10. Since the fluid-filled mount of the invention does not include any oil damper which has metallic components and is complex in construction, the number of parts making up the mount is reduced, and the cost of manufacture of the fluid-filled mount is low.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

What is claimed is:

1. A fluid-filled mount for supporting a vibration member on a structural member comprising:

a body made of a resilient material as a unit and having a first supporting region with a round support hole defined therein for mounting with a structural member on one end and a second supporting region with a round support hole defined therein for mounting a vibration member on the opposite end;

said body having a main fluid chamber defined within a central portion of said body of said resilient material on a longitudinal centerline of said body between said first and second supporting regions, two auxiliary fluid chambers within said body of resilient material, one auxiliary chamber on each side of said main fluid chamber being along a plane perpendicular to the longitudinal centerline between said supporting regions, said auxiliary fluid chambers being disposed so that the distance between said main fluid chamber and each auxiliary fluid chamber is longer than the distance between the outer periphery of each said auxiliary fluid chamber and the outer periphery of said body, and an orifice communicating between said main and auxiliary fluid chambers such that said main and auxiliary fluid chambers are in closed-circuit interaction with each other; and a fluid filling sealed in said main fluid chamber, said auxiliary fluid chamber, and said orifice.

2. A fluid-filled mount according to claim 1, wherein said two auxiliary fluid chambers are symmetrically disposed with respect to the longitudinal centerline, and said support holes are located to be positioned along the longitudinal centerline.

3. A fluid-filled mount according to claim 1, wherein said body is formed by partly vulcanizing two body halves of rubber, bonding said body halves to each other, and then vulcanizing the bonded body halves under compression.

4. A fluid-filled mount according to claim 1, further including a reinforcing member of a flexible material covering the outer peripheral side surface of said body.

5. A fluid-filled mount according to claim 1, wherein said body further includes an inlet passage extending through said body between one of said round support holes and one of said auxiliary fluid chambers, said inlet passage extending from said main fluid chamber to an outer periphery of said body.

* * * * *